United States Patent
Li et al.

(10) Patent No.: US 10,715,436 B2
(45) Date of Patent: Jul. 14, 2020

(54) DYNAMIC LOOP DETECTION AND SUPPRESSION

(71) Applicant: Comcast Cable Communications, LLC, Philadelphia, PA (US)

(72) Inventors: Chia-Chang Li, Holmdel, NJ (US); Mohamed Barache, Centennial, CO (US); Robert Lambardia, Castle Rock, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 703 days.

(21) Appl. No.: 14/289,359

(22) Filed: May 28, 2014

(65) Prior Publication Data

US 2015/0350075 A1 Dec. 3, 2015

(51) Int. Cl.
*H04L 12/24* (2006.01)
*H04L 12/741* (2013.01)
*H04L 12/705* (2013.01)

(52) U.S. Cl.
CPC ........... *H04L 45/745* (2013.01); *H04L 45/18* (2013.01)

(58) Field of Classification Search
CPC .... H04L 12/741; H04L 12/705; H04L 45/745
USPC ......................................................... 709/224
See application file for complete search history.

(56) References Cited

U.S. PATENT DOCUMENTS

| | | | | |
|---|---|---|---|---|
| 7,342,877 | B1* | 3/2008 | Ervin | H04L 12/42 370/217 |
| 7,953,067 | B2* | 5/2011 | Liu | H04W 40/02 370/351 |
| 8,325,891 | B2* | 12/2012 | Wall | H04M 3/10 379/112.1 |
| 2005/0220095 | A1* | 10/2005 | Narayanan | H04L 63/126 370/389 |
| 2006/0045021 | A1* | 3/2006 | Deragon | H04L 1/243 370/249 |
| 2006/0274703 | A1* | 12/2006 | Connelly | H04L 41/0622 370/338 |
| 2007/0230679 | A1* | 10/2007 | Altberg | H04M 7/0036 379/218.01 |
| 2008/0107018 | A1* | 5/2008 | Zhang | H04L 12/1877 370/228 |
| 2008/0107025 | A1* | 5/2008 | Cho | H04L 41/0677 370/235 |
| 2008/0267199 | A1* | 10/2008 | Smith | H04W 88/16 370/401 |
| 2008/0281975 | A1* | 11/2008 | Qiu | H04L 65/1069 709/230 |

(Continued)

*Primary Examiner* — Moustafa M Meky
*Assistant Examiner* — Elizabeth Kassa
(74) *Attorney, Agent, or Firm* — Banner & Witcoff, Ltd.

(57) ABSTRACT

Systems and methods are described for effectively managing and maintaining a communication network by monitoring communications to detect a loop condition, and effectively route the communication to one or more destinations known to reduce or eliminate the occurrence of a looping condition. In one embodiment one or more computing devices may be configured to detect or assign an identifier to an incoming network communication, retrieve routing information from a routing database identifying one or more destinations to route the communication. The one or more computing devices may be further configured to compare the routing information with the identifier to determine an appropriate destination to route the communication.

20 Claims, 10 Drawing Sheets

(56) References Cited

U.S. PATENT DOCUMENTS

| | | | | |
|---|---|---|---|---|
| 2009/0043898 | A1* | 2/2009 | Xin | H04L 45/00 709/228 |
| 2009/0074155 | A1* | 3/2009 | Wang | H04B 10/0775 379/29.03 |
| 2009/0213846 | A1* | 8/2009 | Joseph | H04L 12/2856 370/352 |
| 2010/0304768 | A1* | 12/2010 | Murtagh | H04L 51/14 455/466 |
| 2011/0302311 | A1* | 12/2011 | Gross | H04L 51/00 709/226 |
| 2012/0069980 | A1* | 3/2012 | Wall | H04M 3/10 379/142.04 |
| 2013/0094445 | A1* | 4/2013 | De Foy | H04L 45/021 370/328 |
| 2014/0156822 | A1* | 6/2014 | Choi | H04L 61/303 709/223 |
| 2014/0317190 | A1* | 10/2014 | Mendiratta | H04L 67/14 709/204 |
| 2015/0029895 | A1* | 1/2015 | Smelyansky | H04M 3/545 370/259 |

\* cited by examiner

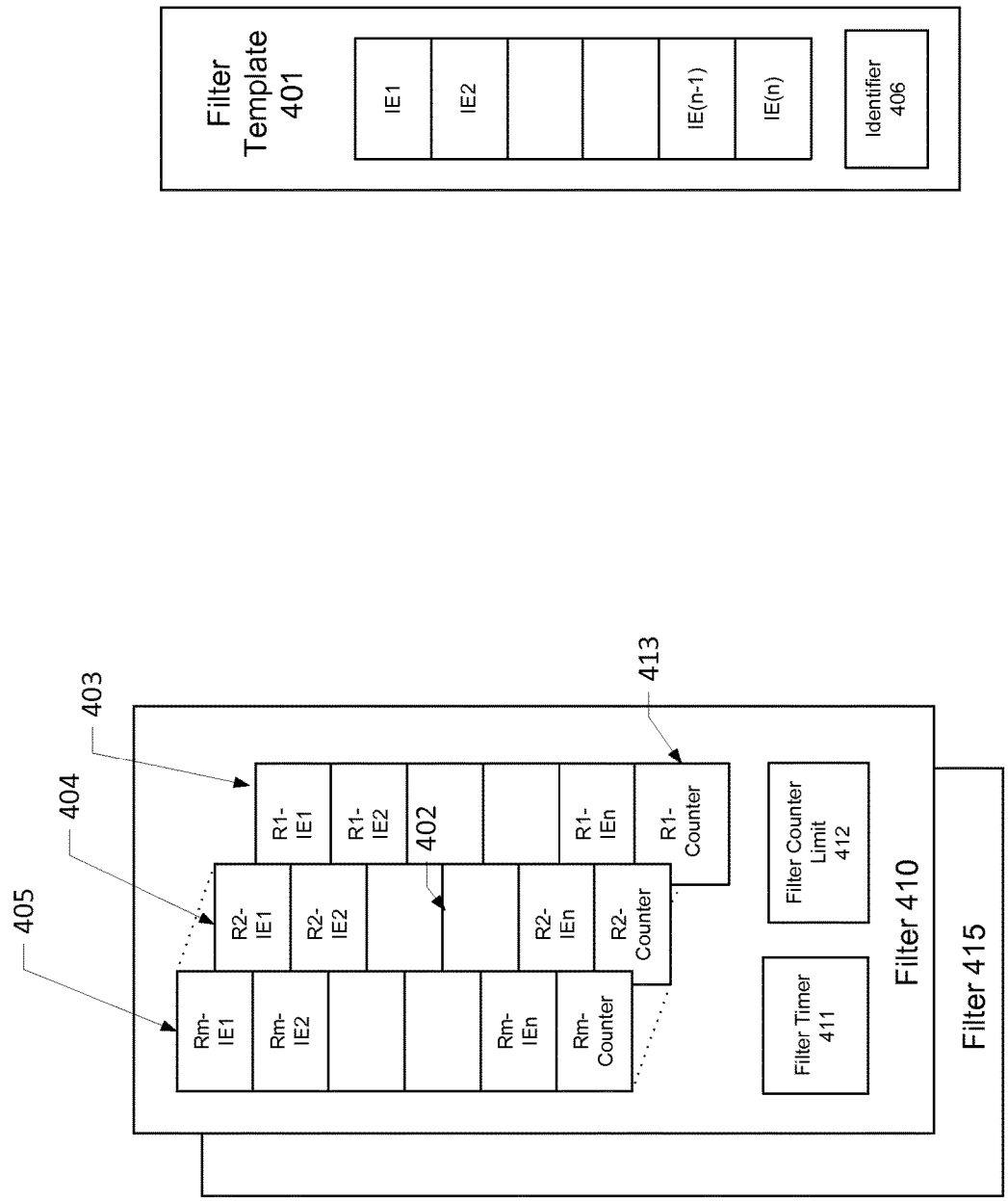

DYNAMIC LOOP DETECTION AND SUPPRESSION

BACKGROUND

Communication networks may utilize telephone systems and Internet Protocol ("IP") based systems to provide communication between computing devices. Session Initiation Protocol ("SIP") is an application-layer control protocol for establishing, terminating, and modifying multimedia sessions with one or more participants, such as Internet telephone calls, multimedia distribution, and multimedia conferences. SIP communications are typically carried over IP protocols and networks, and permit participants to a SIP session to authenticate the participants, determine each other's location, and agree on a set of media types that can be used for transport of the session.

A "loop condition" or looped SIP communication arises, for example, when a SIP communication is routed from a network which processes the request, and thereafter, the SIP request arrives back at the same network and subsequently the request is processed in an identical manner as the previous processing. Thus, the SIP communication may be routed repeatedly across the same network or domain. If the loop condition is not broken, system resources may be wasted on a SIP communication that cannot be completed. Communication networks are becoming more complex due to the increasing number of terminals that can connect customers and available services. For example, many networks utilize voice peering (e.g., VoIP peering), which refers to the forwarding communications from one internet telephony service provider ("ITSP") to another. Because communications sent using VoIP peering are not forwarded over the public switched telephone network ("PSTN") and may be transmitted using particular routing policies, e.g., least cost routing, and because the information of network traversal is not exchanged between service providers, the likelihood of a communication being looped through one or more networks without deterministically and directly associating ingress and egress points may escalate.

Although methods for detecting loop conditions exist (e.g., RFC 3261 describes methods such as a decrementing "Max Forward" counter; and monitoring the lack of change in certain signaling message parameters), it has been observed that known methods are inadequate because increased SIP signaling and instances of malicious attacks are becoming increasingly difficult to control. In addition to detecting loop conditions, there are various other types of undesired SIP communications that a network provider or operator may want to identify and suppress for the purpose of optimizing network resources and efficiency.

Thus, there remains a need for effective approaches to detecting loop conditions, as well as other types of undesired communications, and suppressing the likelihood that looping conditions or other undesirable events may occur on a communication network.

SUMMARY

The following summary is for illustrative purposes only, and is not intended to limit or constrain the detailed description. The disclosure is directed to systems and methods aimed at satisfying the need of effectively managing and maintaining a communication network by establishing filters dynamically and monitoring incoming communications against those dynamic filters to filter certain types of calls (e.g., calls that may result in a loop condition), and effectively route the communication to one or more destinations (e.g., proxy servers) known to reduce or eliminate the occurrence of the looping condition.

Some aspects of this disclosure relate to monitoring incoming SIP communications by comparing one or more data fields in the SIP communication against data records in a filter. Further aspects of this disclosure relate to assigning an identifier to an incoming SIP communication, and determining whether to route that communication based on a comparison of the identifier to information associated with one or more routing records obtained from a routing database.

In an exemplary embodiment of the present disclosure, this is achieved by assigning an identifier to incoming SIP communications which may identify one or more destinations (e.g., proxy servers) likely to contribute to the occurrence of a looping condition. A routing proxy server retrieves routing records identifying one or more potential destinations to route the communication, and then compares the records with the identifier of the SIP communication. Thereafter, the routing proxy server determines the appropriate destination to route the communication.

In some embodiments, information relating to the identifier may be utilized to query the routing database. The routing database may utilize trunking data to identify routing information for the SIP communication, wherein the routing information may identify a set of destination proxy or peer servers that will not result in the occurrence of a looping condition.

In another embodiment, filter templates and corresponding filters may be utilized to detect the likelihood of looping conditions for particular subscribers associated with particular destination locations. One or more filter templates, each representing a particular filtering policy, may be processed and compared to data fields associated with an incoming SIP communication. A filter may be retrieved corresponding to the filter template that matches certain data fields of the incoming SIP communication. Thereafter, the SIP communication is compared to one or more data records associated with the filter to determine whether and how to process the incoming SIP communication.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 4A-C illustrate architectures suitable for demonstrating one or more aspects of this disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be used, and structural and functional modifications may be made, without departing from the scope of the present disclosure.

Figure 1:
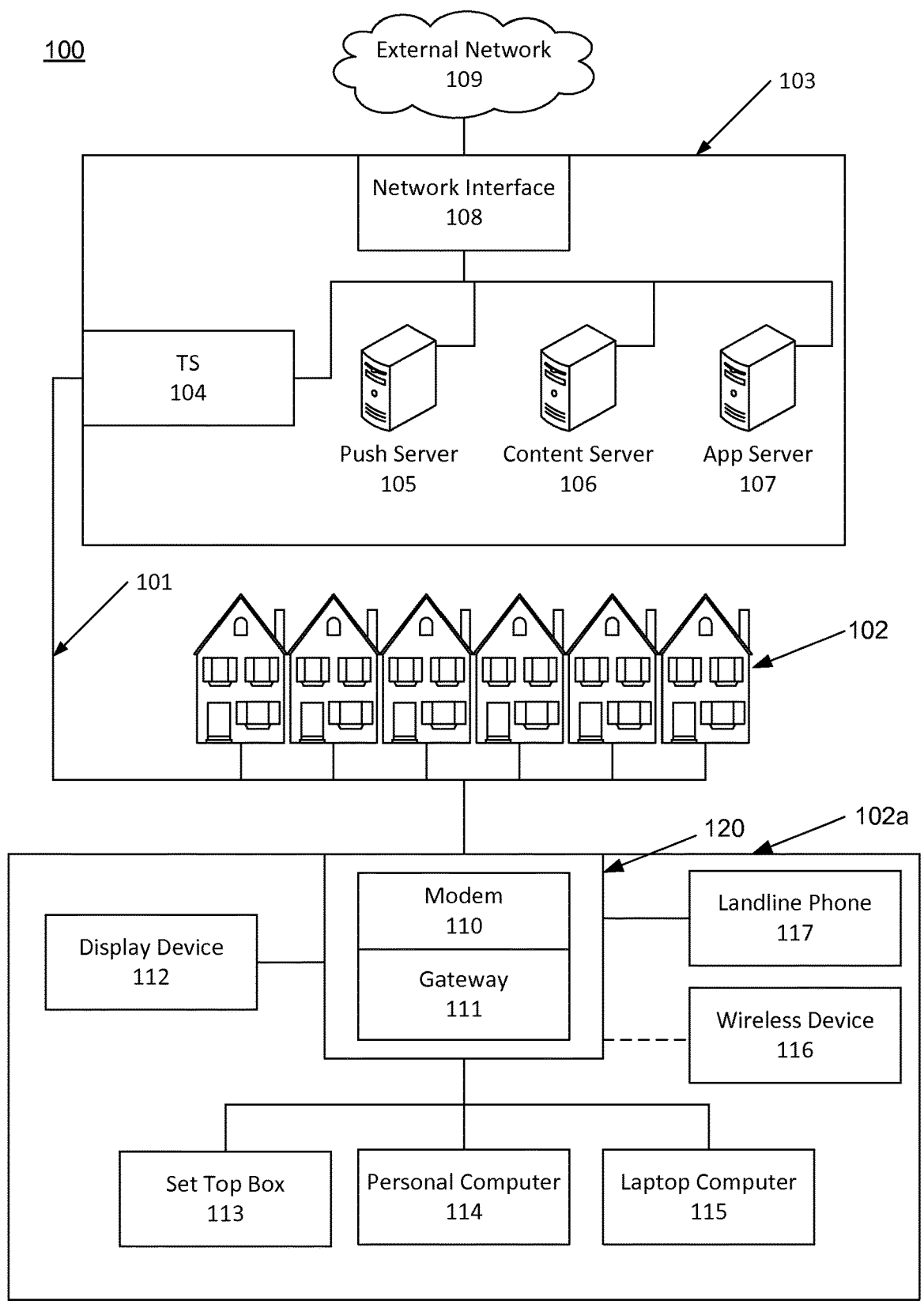
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. In a hybrid fiber-coaxial network, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

The various devices in the system may be configured to perform performance monitoring services. For example, the gateway 111 and modem 110 may monitor its own performance metrics (examples described further below) and may report its own performance metrics to a performance monitoring computing device 118 (not shown in FIG. 1). The performance monitoring computing device 118 may collect performance metric information from a variety of devices in the system (e.g., devices at the various premises 102), and may perform evaluations on the various metrics during a service session to develop an assessment of the real-time performance of a particular device or portion of a network.

Figure 2:
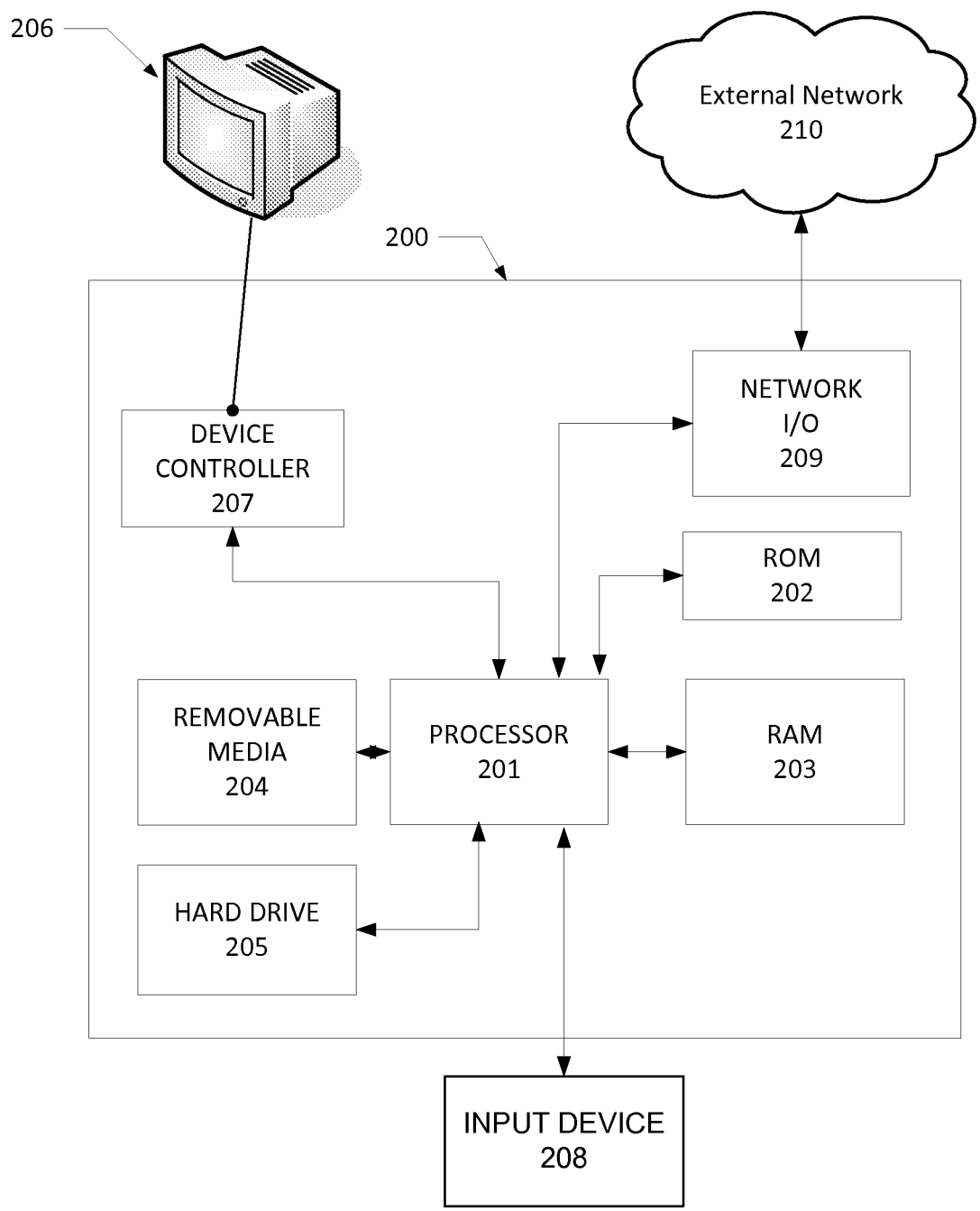
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device. FIG. 2 illustrates a performance monitor 212 component, which may be a dedicated processor configured to perform the various performance monitoring functions described herein, or it may be implemented by the device's main processor 201.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
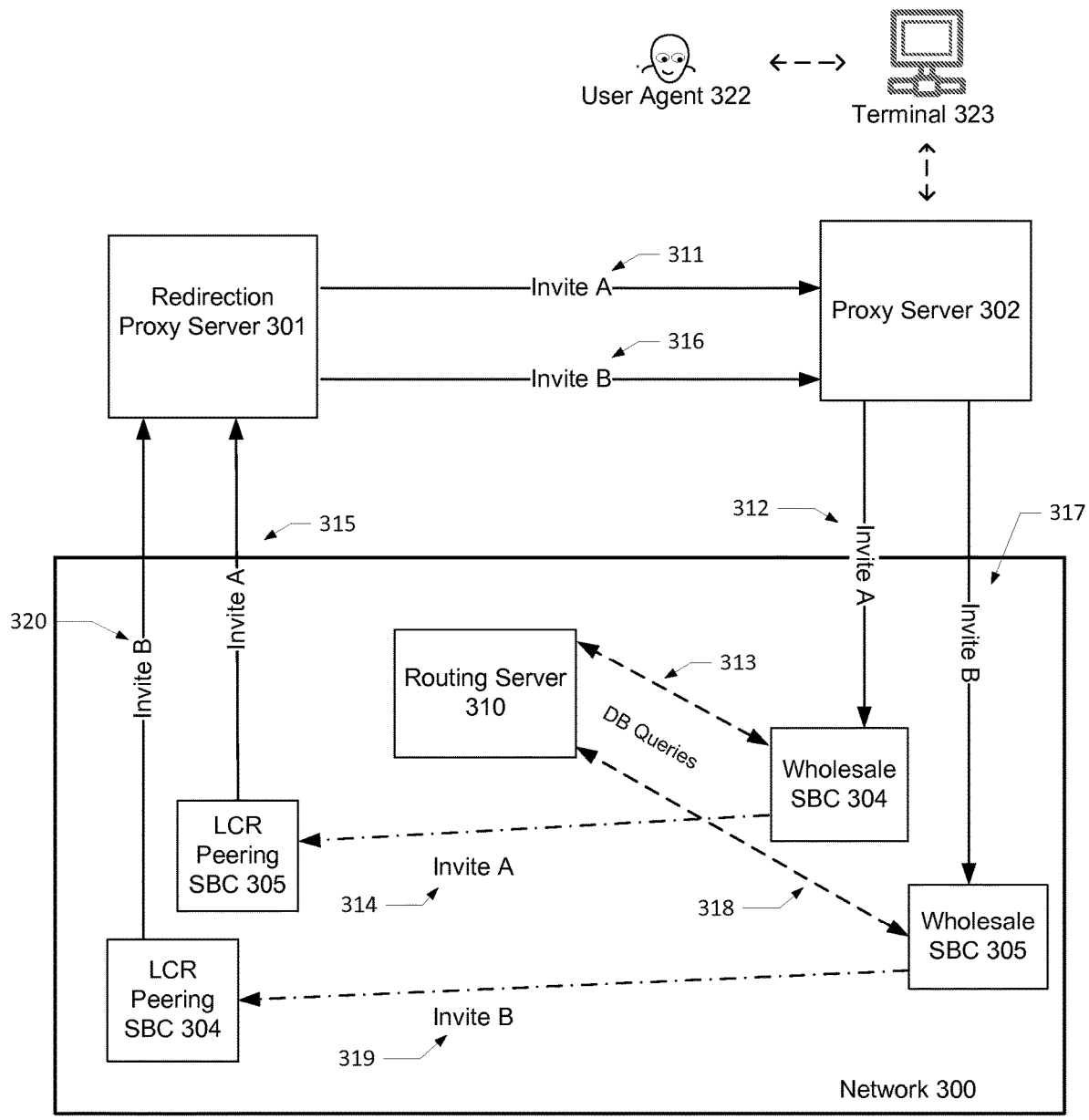
FIG. 3 illustrates an example architecture show an example occurrence of a looped SIP communication.

FIG. 3 illustrates an example of a "loop condition." The loop condition depicted in FIG. 3 is merely one example of the various ways a loop condition may occur, and is not intended to be limiting. As noted above, SIP enables the creation of an infrastructure of network hosts (e.g., proxy servers) to which user agents, such as a customer on the network, can send registration, invitations to sessions, and other requests over a network. A proxy server can receive SIP requests or other SIP communications and forward them on behalf of the requestor (e.g., user agent).

FIG. 3 illustrates an attempt by a computing device (e.g., terminal 323) to send a second computing device a SIP message (e.g., a SIP invite, call, etc.). In some instances, a call initiating software may instruct terminal 323 to forward a SIP communication over a network to its intended destination. In other instances, a user, such as user 322 may utilize terminal 323 to forward a SIP communication over a network to its intended destination In this example, computing device 302 receives from terminal 323 a SIP message (e.g., invite to a SIP session) to forward to a computing device associated with another user (e.g., the invitee). In some instances, computing device 302 may comprise a proxy server. In other instances, computing device 302 may comprise any suitable computing device operating in a peer-to-peer networking environment. After receiving the SIP message from terminal 323, computing device 302 forwards the SIP message (e.g., Invite A) to session boarder controller ("SBC") 304 for routing, as illustrated at element 312 in FIG. 3.

The session border controller is typically employed to exert control over the signaling involved in conducting calls between users on a network, such as providing bandwidth consumption and other resource management policies on a network. For example, a session border controller may check for busy conditions on a network before forwarding a SIP communication to its intended destination. There are a variety of ways in which a session border controller may determine and process routing information for a SIP communication. For example, a session border controller may transmit a query to a routing database to determine where a particular communication should be routed. The session border controller may identify and process information within the SIP communication, such as a uniform resource identifier ("URI"), to determine the identity of the invitee, and accordingly, the final destination of the SIP communication. A URI, or SIP address, is a unique identifier comprising a uniform resource locator and a uniform resource name that uniquely identifies each user on the network, and further acts as a communication moniker allowing other users on the network to contact one another.

A routing database, such as an enumeration or "ENUM" database, acts as a location service, and may contain routing decisions and mappings between a single SIP address (e.g., URI), and a set of one or more alternative locations at which the target of that SIP address can be found. The ENUM (E.164 telephone number mapping) service may support the mapping of telephone numbers (in ITU E.164 format) into uniform resource identifiers ("URIs"). This mapping of telephone numbers into URIs may be performed by Name Authority Pointers ("NAPTRs"). A routing database may use various routing policies or protocols to route a communication within the network. For example, least cost routing ("LCR") may be used to select a path for forwarding outbound SIP communications based on the cost of sending each communication over the network. As another example, "shortest path first" may be used to select a path for forwarding an outbound SIP communication using the shortest path from a plurality of available paths for transmitting the communication to its final destination. As will be appreciated, given the massive size and complexity of communication networks, processing and routing a multitude of communication s within and across network may result in the occurrence of errors, such as looped communications.

Referring back to FIG. 3, after receiving Invite A from computing device 302, SBC 304 transmits a routing query to routing database 310, as illustrated by element 313. In this example, routing database 310 utilizes a least cost routing protocol to identify the computing device (e.g., proxy server) to route the SIP communication. As depicted by element 314, routing database 310 identifies SBC 305 as the next destination for Invite A. As illustrated by element 315, the routing information for Invite A is subsequently forwarded to computing 301. In some instances, computing device 301 may comprise a redirection proxy server. In other instances, computing device 301 may comprise any suitable computing device operating in a peer-to-peer networking environment. Computing device 301 assists the routing of a SIP communication by forwarding a response in the form of routing information back to the terminal, proxy server, or other computing device associated with the originator of the SIP message so that the communication may be re-routed according to the updated routing information. When redirecting the SIP communication, computing device 301 may modify the SIP communication to include the new destination URI. Alternatively, the proxy server may leave the URI that was targeted by the initial SIP message intact, but specify additional transport parameters for routing the communication to its new destination.

As depicted by element 311 in FIG. 3, computing device 301 forwards the routing information for Invite A back to computing device 302. After receiving the new routing information for Invite A, computing device 302 may send a new SIP communication or message (i.e., Invite B) based on the updated routing information. Although computing device 302 may transmit a different SIP message than the original SIP message sent by terminal 323, the SIP communication may contain similar routing parameters and URI information, such as a calling party identifier or a called party identifier. For example, although the destination URI information of Invites A and B may be identical, the transport parameters may differ. As illustrated by element 317 in FIG. 3, computing device 302 sends a new SIP message (i.e., Invite B) to SBC 305 in accordance with the updated transport parameters that were transmitted from redirection computing 301. However, as noted above, Invite B may still contain the same destination URI information as the original SIP message (i.e., Invite A).

After receiving Invite B from computing device 302, SBC 305 queries routing database 310, as illustrated by element 313, using the URI and transport parameters contained within Invite B. Routing database 310 may then identify a session border controller to forward Invite B based on a least cost routing policy. In this example, as illustrated by element 319, routing database 310 identifies SBC 304 as the appropriate SBC to forward Invite B. As illustrated by element 320, updated routing information for Invite B is forwarded to computing device 301. Subsequently, computing device 301 forwards the new routing information for Invite B to computing device 302, as illustrated by element 316 in FIG. 3. As noted above, proxy server 302 may send a new SIP communication or message based on the updated routing information sent from computing device 302, and this communication may contain similar routing information as the SIP message (i.e., Invite A) originally sent by terminal 323. As such, the new SIP message may be forwarded along the same communication path as the original message, thus resulting in the occurrence of a loop condition.

Referring now to FIG. 4A, to help detect such loop conditions (or other types of undesirable calling patterns), the above-described system may use filter templates (e.g., filter template 401) and filters (e.g., filter 410, 415) at any one or more of the routing steps (e.g., by the proxy server 302, the wholesale SBC 304, etc.) to detect patterns in communications that are indicative of a loop condition, a developing loop condition, or other undesirable calling pattern, and to take action to break the looping cycle or the undesirable calling pattern when such cycles/patterns are detected. As illustrated in FIG. 4B, a filter template may be comprised of one or more information elements (e.g., filter elements), such as information element 402, and an identifier 406 that uniquely identifies each filter template created by the system. The filter templates may each identify 1) information that needs to be tracked to detect a particular type of undesired call, such as a call that would result in a loop condition; and 2) rules for determining when the tracked information indicates an occurrence of the undesired calling pattern. The tracked information may be represented by information elements that are stored within a data record.

As an example of how these filter templates and filters may be used, one type of loop condition may occur when a high frequency of calls occurs between the same two telephone numbers in a short amount of time (e.g., 5 calls between the same numbers in 30 seconds). A filter template for that kind of loop condition may indicate that the information that needs to be tracked to detect this type of calling pattern (e.g., loop condition) includes the calling party identifier (e.g., a telephone number, email address, IP address, etc.), and the called party identifier. As communication requests are processed, they may be compared against filter templates to determine if the requests contain information that should be tracked. This may be achieved by comparing information contained within the communication request (e.g., calling party identifier, called party identifier, etc.) to information elements (e.g., information element 402) in the filter template. If a communication request contains information to be tracked for a filter template, the system may create (or update) a filter (e.g., a data file) and/or data records in which to store that tracked information. So, using the 5-calls-in-30-seconds example noted above, the system may create one filter to track the various unique pairs of calling/called parties. The filter may then store data records, wherein each data record identifies a unique pair of calling/called parties. The system may track the number of incoming communication requests attributed to a particular pair of calling/called parties by incrementing a counter (e.g., counter 413) each time the same particular calling party issues a communication request to the same called party.

In some embodiments, in addition to tracking the calling party identifier and the called party identifier, the filter template used to filter/suppress the occurrence of loop conditions may also track the time of call. Instead of utilizing one filter to track the various unique pairs of calling/called parties, in such embodiments, the system may create multiple filters, wherein each filter identifies a unique pair of calling/called parties. Accordingly, each filter may store a data record identifying the various times at which the same calling party issued a communication request to the same called party. In such embodiments, the system may track the number of incoming communication requests attributed to a particular pair of calling/called by incrementing a filter record counter (e.g., record counter 423) each time the same particular calling party issues a communication request to the same called party.

Figure 4C:
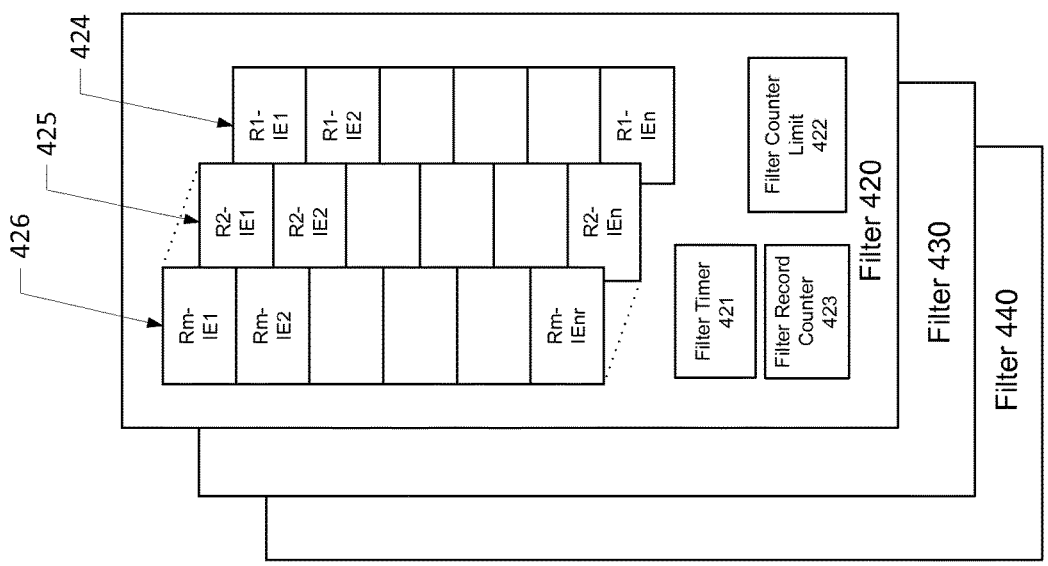

To make processing easier, the filters may store information summarizing the filter contents, such as a timer 411 indicating the time window (e.g., 30-seconds), a record counter limit 412 indicating how many data records added to the filter within the time window may result in a loop condition (e.g., 5 calls) or other undesired calling pattern. In some embodiments, a filter may also include a record counter, e.g., record counter 423 as illustrated in FIG. 4C, which identifies the number of data records in the filter. The time window identifies the duration of time that data record(s) will remain in the filter, and may be defined when the filter is created. Data records may store information summarizing the data record contents such as information elements and a counter, e.g., counter 413 as illustrated in FIG. 4A. The counter may track the number of incoming communication requests detected by the system that correspond to the data record.

As noted above, the filter template may also identify one or more rules for determining when the tracked information indicates a loop condition. In operation, the elements in the system may check these rules whenever they process a new communication request and/or when they update a filter. Using the same 5-calls-in-30-seconds example from above, the system may add a data record to a filter (e.g., by incrementing counter 413) for a particular pair of calling/called parties, and when incrementing the counter, it may determine whether the filter now exceeds the 5 call threshold. In some embodiments, (e.g., embodiments where the filter template may track the time of call), using the same 5-calls-in-30-seconds example from above, the system may add data records to a filter for a particular pair of calling/called parties, and when adding the data record, it may determine whether the filter now includes data records for at least 5 calls occurring in the same 30-second window. As will be discussed in further detail below, the system may utilize various operations of Boolean logic in relation to the tracked information to govern which communication requests will be subject to particular filtering policies.

Filters may be characterized as dynamic or static filters. A filter may be "dynamic," in that one or more data records can be added to the filter over time based on a comparison of incoming communication requests and filter templates. In such embodiments, a dynamic filter may be created when the loop condition (or other undesirable calling pattern) being detected depends on knowing a history of calls between the same calling/called party. However, some kinds of calling patterns need not depend on such a history of calls. For example, the system operator (e.g., administrator) may already know that calls originating from a particular calling party and to a particular called party will automatically result in a loop condition, or will otherwise simply be an undesired call. In such embodiments, a "static" filter may be created. Static filters may be configured to include data records identifying the particular calling/called party, and need not be modified to include additional data records. In these embodiments, the system can be configured to check the static filter(s) with each requested communication to determine if the communication will result in some kind of loop condition. A network or service administrator may have the option of specifying whether a filter is dynamic or static. In some embodiments, the system may utilize a flag, or other suitable identifier, to identify whether a particular filter has been configured or identified as dynamic or static.

In accordance with one or more embodiments described herein, in addition detecting the occurrence of some kinds of loop conditions, filter templates and filters may be utilized to also detect the occurrence of other types of undesired calls or calling patterns. For example, one type of undesired call (e.g., a robocall) may occur when a high frequency of automated calls are generated over a short time period from one calling party to several other parties located in the same geographic location (e.g., 100 calls in 10 minutes from the same number to multiple parties residing in eastern Pennsylvania). A filter template for robocalls may indicate that the information that needs to be tracked to detect this type of undesired call includes the calling party identifier and the geographic location of the called party. As communication requests are processed, they may be compared against filter templates to determine if the requests contain information that should be tracked. If an incoming communication request contains information to be tracked by the filter template, the system may create (or update) a filter and/or data records in which to store that tracked information. So, using the 100-calls-in-10-minutes example noted above, a filter may contain one data record for each unique calling party and geographic location pair. Each data record in the filter, which corresponds to a unique calling party/geographic location pair, includes a counter identifying the number of instances in which the same calling party issued a communication request to a called party in the same geographic location.

In some embodiments, in addition to tracking the calling party identifier and the geographic location of the called party, the filter template used to filter/suppress robocalls may also track the time of call. Instead of utilizing one filter to track the various unique calling party and geographic location pairs, in these embodiments, the system may create multiple filters, wherein each filter identifies a unique calling party and geographic location pair. Using the 100-calls-in-10-minutes example noted above, there may be different filters for each unique calling party and geographic location pair. Each filter may then store data records, identifying the times at which the same calling party issued a communication request to a called party in the same geographic location.

Filter templates and communications filters may also be utilized to suppress the occurrence of an undesired calling pattern or frequency. For example, call-gapping may be used to throttle traffic on a network when a high frequency of calls is made within a short period. For instance, 100 people may simultaneously attempt to call the same number because it was announced on a television program. A filter template associated with a call-gapping policy may indicate that the information that needs to be tracked to detect this pattern of calls includes the called party identifier. As communication requests are processed, they may be compared against filter templates to determine if the requests contain information that should be tracked. If an incoming communication request contains information to be tracked for a filter template, the system may create (or update) a filter and or data records in which to store that tracked information. So, using the call-gapping example noted above, a filter may include one data record for each unique called party receiving multiple call requests. Each data record, which corresponds to a unique called part, includes a counter identifying the number of instances in which the called party received a communication request from a calling party.

In some embodiments, in addition to tracking the called party identifier, the filter template used to implement a call-gapping policy may also track the time of call. Instead of utilizing one filter to track the various unique called parties, in these embodiments, the system may create multiple filters, wherein each filter identifies a unique called party. So, using the call-gapping example noted above, there may be different filters for each unique called party receiving multiple call requests. Each filter may then store data records, identifying the various times at which the called party received a communication request from a calling party.

The system may utilize various operations of Boolean logic (e.g., conjunction, disjunction, negation, etc.) in relation to the information tracked by a filter template to control which communication requests will be subject to a particular filtering policy. In one example, a filter template may be associated with a particular method of call gapping, which may be implemented when a high frequency of calls are made within a short period of time. In this example, in the event of a large-scale emergency or natural disaster, a network may want to throttle the number of calls being made from the same geographic region (i.e., the location of where the event occurred). However, the network may not want the filter policy to disrupt calls being made to certain emergency services (e.g., 911, the police, etc.). The filter template for this particular method of call-gapping policy may indicate that the information that needs to be tracked includes the geographic location of the calling party AND NOT a particular called party identifier (e.g., telephone numbers for certain emergency services). Thus, all SIP requests (e.g., calls) being made from the geographic location of where the even occurred may be subject to the filter policy for this filter template, except for those requests being made to particular emergency services.

FIGS. 4A and 4C illustrate a series of filters that may be used in accordance with one or more embodiments of the disclosure as described above. In particular, FIG. 4A depicts a first filter type (e.g., filters 410 and 415), which may be used in accordance with one or more embodiments of the disclosure, wherein the system creates one filter to track the various sets of information in relation to a particular filter template. While not shown in FIG. 4A, filter 415 (and other filters of the first filter type) may include the same or similar elements (e.g., filter timer, filter counter limit, data records, etc.) as filter 410. The first filter type, depicted in FIG. 4A, may be configured to store data records such that each data record identifies a unique data set. For example, using the 5-calls-in-30-seconds example discussed above, each data record in filter 410 (e.g., data records 403-405) may identify a different, unique pair of calling/called parties. In this example, data record 403 stores information relating to a first pair of calling/called parties; data record 404 stores information relating to a second pair of calling/called parties; and data record 405 stores information relating to a third pair of calling/called parties.

As another example, using the 100-calls-in-10-minutes example discussed above, each data record in filter 410 may identify a unique calling party/geographic location pair. In this example, data record 403 stores information relating to a first calling party/geographic location pair; data record 404 stores information relating to a second calling party/geographic location pair; and data record 405 stores information relating to a third calling party/geographic location pair. Each data record stored within the first filter type may include a counter such that the system may track the number of instances a particular data record has been added to the filter. For example, the system will increment counter 413 for each time an instance of data record 403 is stored in filter 410. Timer 411 stores information identifying the duration of time (e.g., time window) that data records will remain in the first filter type. The time window for the first filter type may be defined when the filter is created. When the time window expires, all of the data records in the filter will be deleted.

FIG. 4C depicts a second filter type (e.g., filters 420, 430, and 440), which may be used in accordance with one or more embodiments of the disclosure, wherein the system creates a plurality of filters to track the various, unique sets of information in relation to a particular filter template. While not shown in FIG. 4C, filters 430 and 440 (and other filters of the second filter type) may include the same or similar elements (e.g., filter timer, filter counter limit, filter record counter, data records, etc.) as filter 420. The second filter type, depicted in FIG. 4C, may be configured to store data records such that each data record identifies an instance of the particular set of tracked information, including a time of call. For example, using the 5-calls-in-30-seconds example discussed above, each data record stored in filter 420 (e.g., data records 424-426) may identify an instance of the same pair of calling/called parties. In this example, data record 424 stores information relating to a first communication request for a first pair of calling/called parties; data record 425 stores information relating to a second communication request for the first pair of calling/called parties; and data record 426 stores information relating to a third communication request for the first pair of calling/called parties. Timer 421 stores information identifying the duration of time (e.g., time window) that data records will remain in the second filter type. The time window for the second filter type may be defined when the filter is created. The system may compare the time of call for a particular data record with the current time to determine whether the data record should be deleted.

The system may utilize either filter type to store data records in accordance with particular filtering policies, such as detecting and/or suppressing loop conditions or other undesired calls. For example, filter 420 may be associated with a filter template for detecting and/or suppressing the occurrence of robocalls. As discussed above, such a filter template may indicate that the information that needs to be tracked to detect this type of undesired call includes the calling party identifier, the geographic location of the called party, and time of call. As will be appreciated, RFC 6442 produced by the IETF in December 2011, outlines various SIP location conveyance techniques that may be utilized to identify geographic location information associated with a calling party or called party. In this example, a network provider could utilize filter 420 to detect the occurrence of robocalls by identifying a plurality of incoming SIP requests or communications sent by a particular calling number (e.g., user agent) to other user agents or network subscribers within a particular geographic location. As will be appreciated, even if the party initiating the robocalls subsequently modifies their calling number, a new filter may be created in accordance with the filter template used to detect robocalls, and may include the new calling number for the party initiating the robocalls.

Filter contents, such as the timer and record counter limit can be adjusted to regulate the use of resources (e.g., bandwidth) on the network. For example, using the same 5-calls-in-30-seconds example from above, the time window of timer 411 may be adjusted upward or downward (e.g., 60 seconds or 15 seconds) to provide the system with either more or less time to process a sufficient number of communication requests that may indicate the occurrence of a loop condition. As a result, the system can be configured to process a fewer number of calls likely to result in a loop condition or other undesirable call pattern, thus reducing the amount of wasted network resources. As another example, record counter limit 412 may be adjusted upward (e.g., 10 calls) or downward (e.g., 3 calls), thus requiring the system to detect either a greater or lesser number of communication requests when determining the occurrence of a loop condition.

Once a loop condition or other undesirable call has been detected, incoming communication requests (e.g., calls) can be filtered and processed in a manner that permits the network provider to take corrective measures to suppress additional undesirable calls. For example, the system may reject calls between a calling party and a called party that are known to result in a loop condition, and may be further configured to generate a static filter that includes data records identifying the particular calling/called parties. As another example, the system may reject calls transmitted by the originator of the robocalls, and/or transmit one or more various response codes to the originator of the robocalls. As yet another example, the system may reject a certain percentage of calls transmitted by the originator of the robocalls. For instance, the system may reject 50% of the calls being sent by the originator of the robocalls.

Figure 5A:
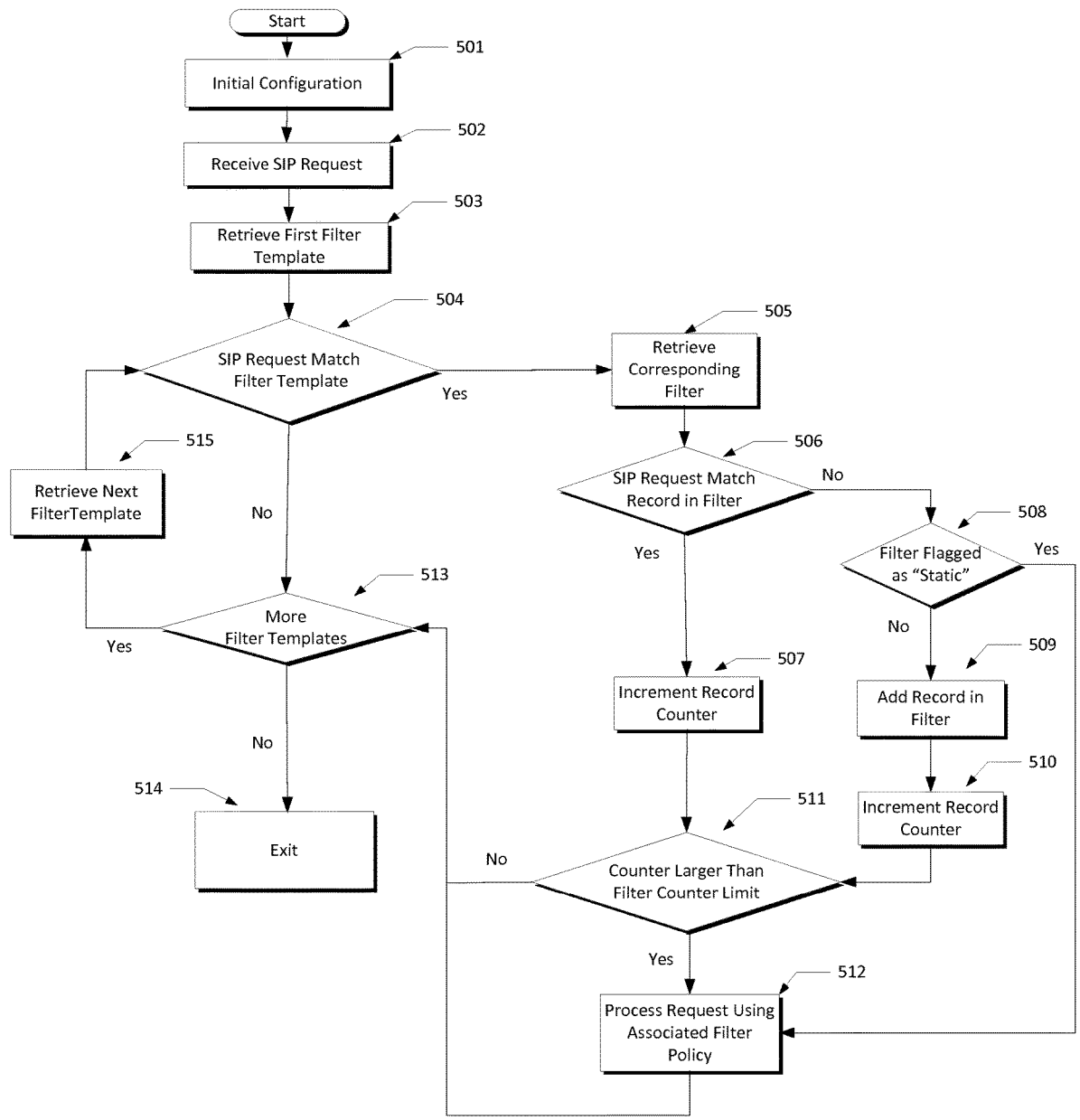
FIGS. 5A-B illustrate exemplary flowcharts of methods in accordance with one or more aspects of the present disclosure.

FIG. 5A illustrates an example method for detecting a loop condition utilizing a first filter type (e.g., filter 410) according to one embodiment of the disclosure that may be performed by one or more computing devices, such as server 107 or any other suitable computing device. When describing the steps of the method below, the term "system" may be used when referring to each component, either singularly or collective, employed at each step of the method. Such usage is merely for ease in discussing the method, and should not be interpreted as limiting the exact embodiment in which the following method may be performed.

At step 501, an initial system configuration may be performed. In some embodiments the system may be configured to identify one or more previously generated filter templates and corresponding filters. In one of these embodiments the system may be configured to store in a database the one or more identified filter templates and corresponding filters. In one embodiment, the system may prompt an administrator for the network or service provider to identify the various types of information to be tracked by one or more filter templates. For example, the administrator may identify that a particular filter template should contain information elements corresponding to a calling party identifier and a called party identifier. As another example, the administrator may identify that a particular filter template should contain information elements corresponding to a calling party identifier and a geographic location of a called party.

In some embodiments, an administrator may have the option of establishing default timer and/or record counter limit values for new filters. In one of these embodiments, default timer and/or record counter limit values may be associated, in a database, with information identifying particular filter templates. Thus, new filters may be generated in accordance with filter content information (e.g., information relating to timer and/or record counter limit values) relating to a particular filter template. In some embodiments, the system may be configured to delete data records in a filter upon the expiration of the timer.

At step 502, the system may receive a SIP request (e.g., SIP communication). In some embodiments, the SIP request may be transmitted from a computing device, such as a user terminal (e.g., client), associated with a particular user agent or subscriber on the network. In other embodiments, the SIP request may be transmitted from a proxy server. In one of these embodiments, the proxy server may be forwarding a SIP request previously sent by a user terminal (e.g., client). In one embodiment, the system may store in memory one or more data fields or parameters associated with the SIP request received during step 302.

A SIP request (e.g., SIP communication) may take on a variety of different formats, such as a phone call, an electronic mail communication, a SMS message, a MMS message, an audio message, etc. For example, a SIP request may comprise an Invite, which indicates a user agent is being invited to participate in a SIP session. As another example, a SIP request may comprise a Message which transports an instant message using SIP. As yet another example, a SIP request may comprise a Register which registers the address(es) identified in one or more parameters of the SIP request with a server or other suitable computing device.

After receiving the SIP request, the method may move to step 503 where the system may retrieve a first filter template (e.g., filter template). In some embodiments, the system may retrieve from memory a filter template identified during step 501. In other embodiments, the system may retrieve a filter template from one or more suitable computing devices operatively coupled to the network. In one of these embodiments, the system may be configured to transmit to one or more computing devices a request for the filter template. In another embodiment, the system may retrieve, and subsequently store in memory, other information associated with the filter template, such as a filter template identifier.

At step 504, the system may determine whether the SIP request received during step 502 matches the filter template retrieved during step 503. In some embodiments, the system may compare one or more data fields (e.g., parameters) of the received SIP request with information elements in the filter template to determine if the SIP request contains information that should be tracked. For example, referring to FIG. 4B, filter template 401 may be associated with a particular filter policy for detecting/suppressing loop conditions, and the information elements within the filter template (e.g., IE1 and IE2) may indicate the specific information that needs to be tracked to detect the loop conditions (e.g., the calling party identifier and called party identifier). The system may compare one or more data fields in the received SIP request with IE1 and IE2 of filter template 401 to determine whether the incoming SIP request contains information that needs to be tracked based on the filtering policy of filter template 401.

If the system determines that the SIP request does not match the retrieved filter template, the method may proceed to step 513. For example, if the filter template retrieved at step 503 requires a calling party identifier and a called party identifier, and the SIP request retrieved at step 502 does not contain each of those parameters, the system may determine that the SIP request does not match the filter template. At step 513, the system may determine whether any additional filter templates should be analyzed. If the system determines that additional filter templates should be analyzed, the method may proceed to step 515, where the system may retrieve the next filter template. After retrieving the next filter template, the method may proceed back to step 504, where the system may determine whether the SIP request received during step 502 matches the next filter template (e.g., the filter template retrieved at step 515).

Referring back to step 504, if the system determines that the SIP request received at step 502 matches a retrieved filter template, (e.g., the SIP communication contain information identified in a filter template, retrieved during either one of steps 503 or 515, that needs to be tracked), the method may proceed to step 505, where the system may retrieve the filter matching the filter template and SIP request analyzed during step 504. As will be appreciated, there are a variety of ways in which the system may retrieve the matching filter. For example, in one embodiment, the system may retrieve the filter from memory. As another example, the system may query a database to determine the location of the corresponding (e.g., matching) filter.

At step 506, the system may determine whether information within the SIP request received at step 502 matches the data contents of one or more data records within the filter retrieved at step 505. In one embodiment, the system may analyze one or more data records within the filter retrieved during step 505 to identify the information stored within each data record. In some embodiments, the system may compare information within one or more data fields (e.g., parameters) of the SIP request to the one or more information elements of a data record within the filter to determine whether the SIP request matches that data record. In other embodiments, the system may determine that a SIP request matches a particular data record when certain data fields in the SIP request matches corresponding information elements within that data record. Referring to FIG. 4B and using the loop detection example discussed above, the system may compare data fields in the incoming SIP request identifying the calling party and called party for that request with information elements (e.g., IE1 and IE2) for the one or more data records in filter 401. In this example, IE1 and IE2 identify the calling party and called party for each data record stored within filter 410. Thus, the system will compare IE1 and IE2 of data records 403-405 with the information identifying the calling/called parties of the incoming SIP request to determine if a match exists. As will be appreciated, a data record within a filter may represent an instance of at least one previously transmitted SIP request that matched the filter template associated with the filter. In another embodiment, the system may store in memory information identifying the data record that matches the SIP request.

If the SIP request received at step 502 corresponds to (e.g., matches) a data record within the filter retrieved at step 505, the method may proceed to step 507, where the system may increment by 1 the counter of the data record matching the incoming SIP request. For example, referring to FIG. 4A, if the calling/called parties of the incoming SIP request match IE1 and IE2 of data record 403, then the system will increment counter 413 by 1. In some embodiments, the system may be configured to retrieve from memory information identifying the data record that matches the SIP request received at step 502. In other embodiments, the system may store in memory information relating to the current total of counter 413. After incrementing the counter, the method may proceed to step 511.

If the SIP request received at step 502 does not correspond to (e.g., match) a data record within the filter retrieved at step 505, the method may proceed to step 508, where the system may the system may determine whether the filter retrieved at step 505 has been flagged (e.g., identified) as "static." In some embodiments, the system may analyze one or more parameters associated with the filter to determine whether the filter has been identified as static. If the filter has been identified as static, additional data records cannot be added to the filter, and existing data records cannot be modified. Thus, the method may proceed to step 512, where the system may process the SIP request using a filtering policy associated with the filter template analyzed during step 504.

If the filter has not been identified as a "static" filter, the method may proceed to step 509, where the system may add a data record to the filter retrieved at step 505. The data record added to the filter may contain SIP request information that needs to be tracked as indicted by the filter template. For example, if the filter template indicates that a calling party identifier and a called party identifier needs to be tracked, a data record may be added to the filter containing information elements identifying at least the calling party and the called party for the SIP request received at step 502. After the data record has been added to the filter, the system may proceed to step 510, where the system may increase (e.g., increment) by 1 the counter of the data record that was added to the filter. In some embodiments, the system may assign an identifier to the added data record such that the system may uniquely identify that data record. In yet another embodiment, the system may be configured to store in memory information identifying the added data record, such as an identifier assigned to the data record. In other embodiments, the method may skip step 510. In one of these embodiments, the method may proceed from step 509 to step 502, where the system may receive another SIP request.

At step 511, the system may determine whether the counter for one or more data records within the filter retrieved at step 505 exceeds the record counter limit (e.g., a threshold number of data records) for that filter. For example, referring to FIG. 4A, the system may determine whether counter 413 meets and/or exceeds record counter limit 412 of the filter by comparing information relating to the number of instances of a particular data record within the filter (e.g., the counter) with information relating to the threshold number of data records for the filter (e.g., the record counter limit). In some embodiments, prior to determining whether the counter for one or more data records in a filter exceeds the record counter limit, the system may determine whether the timer for the filter has expired.

If a counter for the one or more data records within the filter retrieved at step 505 does not exceed the record counter limit, the method may proceed to step 513, where the system may determine whether any additional filter templates should be analyzed. If the counter exceeds the record counter limit, the method may proceed to step 512. At step 512, the system may process the SIP request using a filtering policy associated with the filter template analyzed during step 504. As will be appreciated, the one or more filtering policies associated with a particular filter template may govern how the system processes a SIP request. In some embodiments, the system may transmit one or more response codes to a computing device associated with the originator (e.g., client, user terminal, etc.) of the SIP request. As will be appreciated, a variety of response codes may be transmitted to the intended recipient of the SIP request. For example, the system may send a SIP 482 response code indicating that the system has identified a loop. As another example, the system may send a SIP 487 response code indicating that the SIP request has terminated. As yet another example the system may send a SIP 181 response code indicating that the SIP request is being forwarded to another computing device, such as a proxy server, session border controller, client terminal, etc. In other embodiments, the system may reject the SIP request. In some embodiments, the system may be configured to reject a certain percentage of SIP requests matching a particular filter policy. For example, the system may accept one call for every two calls that match the filter policy.

In some embodiments, the system may forward the SIP request to a computing device, such as a proxy server or session border controller, to re-route the SIP request. In one of these embodiments, the SIP request may be routed by the computing device in accordance with one or more filtering policies associated with the filter template. As will be discussed in further detail below with respect to FIGS. 6A and 6B, the system may route the SIP request using a communication path that will not result in the occurrence of a loop condition or other undesirable call. During step 512, in some embodiments, the system may assign an identifier to the originator of the SIP request such that the system may subsequently identify the originator. In one of these embodiments, the system may store in memory information identifying the originator of the SIP request. In another of these embodiments, the system may flag the originator of the SIP request as having a high likelihood of initiating the occurrence of a looped SIP request on the network (e.g., a looping customer).

In yet another of these embodiments, the system may store in memory other information associated with the SIP request, such as one or more data fields or parameters of the SIP request. For example, the system may store in memory one or more trunk group parameters associated with the SIP request. As another example, the system may store in memory URI information within the SIP request, such as a calling party identifier and/or a called party identifier. In another of these embodiments, the system may be configured to generate a static filter that includes data record identifying particular URI information from the SIP request, such as a calling party identifier. As will be appreciated, generating a static filter containing data records identifying URI information associated with the calling/called party pair may assist the system to effectively identify and potentially suppress future calls between the calling and called party.

After processing the SIP request, the method may proceed to step 513, where the system may determine whether any additional filter templates should be analyzed for the SIP request received during step 502. If the system determines that no additional filter templates should be processed, the method may proceed to step 514, and the system may exit the method. In some embodiments, if the system determines that no additional filter templates should be processed, the method may proceed from step 513 to step 502, where the system may receive another SIP request.

Figure 5B:
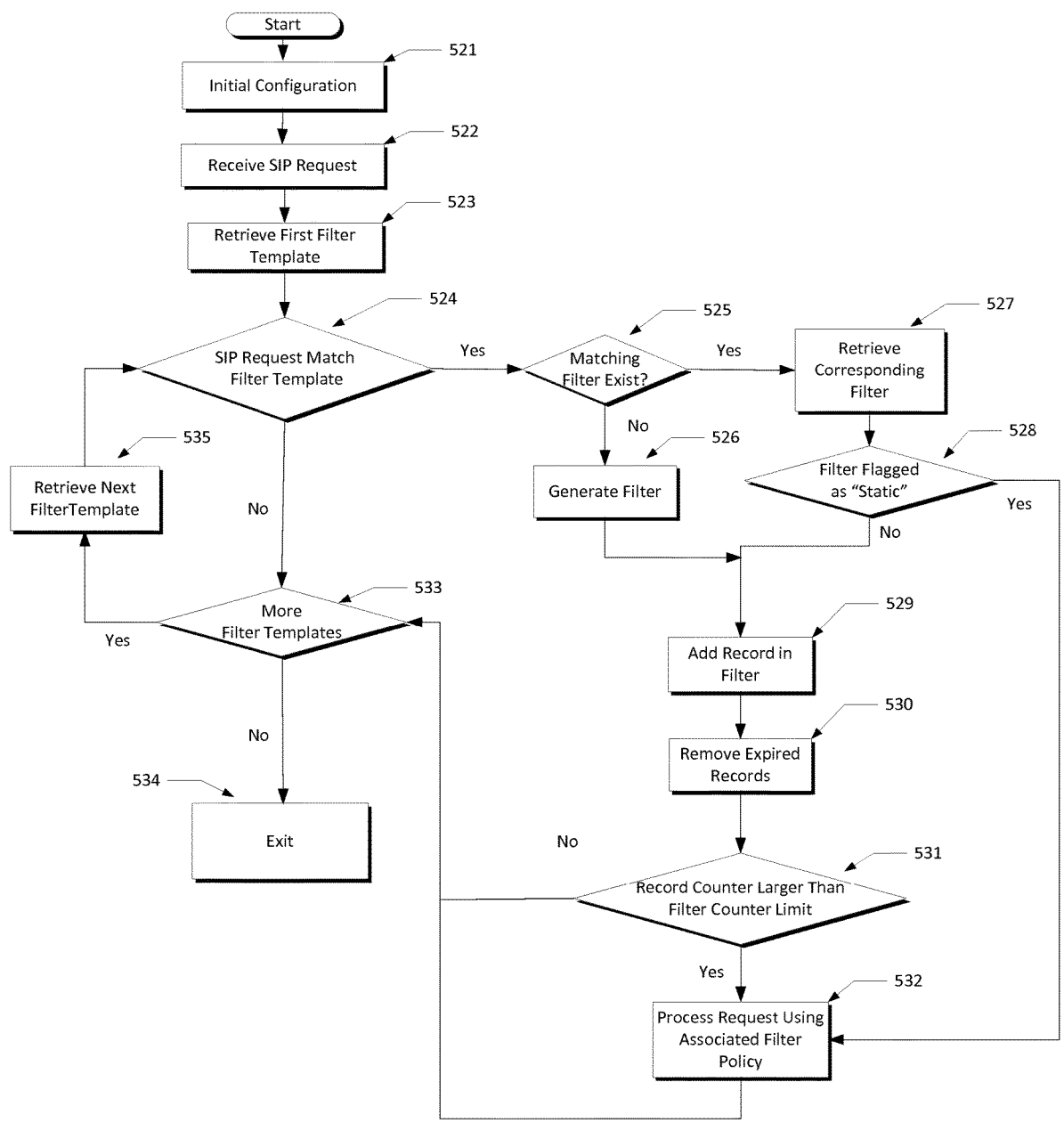

FIG. 5B illustrates an example method for detecting a loop condition utilizing a second filter type (e.g., filter 420) according to one embodiment of the disclosure that may be performed by one or more computing devices, such as server 107 or any other suitable computing device. At step 521, an initial system configuration may be performed. In some embodiments the system may be configured to identify one or more previously generated filter templates and corresponding filters. In one of these embodiments the system may be configured to store in a database the one or more identified filter templates and corresponding filters. For example, the administrator may identify that a particular filter template should contain information elements corresponding to a calling party identifier, a called party identifier, and a time of call. As another example, the administrator may identify that a particular filter template should contain information elements corresponding to a calling party identifier, a geographic location of a called party, and a time of call.

In some embodiments, an administrator may have the option of establishing default timer and/or record counter limit values for new filters. In one of these embodiments, default timer and/or record counter limit values may be associated, in a database, with information identifying particular filter templates. Thus, new filters may be generated in accordance with filter content information (e.g., information relating to timer and/or record counter limit values) relating to a particular filter template. In other embodiments, an administrator may have the option of adjusting the default timer and/or record counter limit values for filters. In some embodiments, the system may be configured to reset the timer and/or record counter for one or more filters. In one of these embodiments, the system may be configured to reset the timer for a filter upon expiration of the time window for that particular timer. In other embodiments, the system may be configured to delete data records in a filter based on the length of time (e.g., time window of the timer) a data record has remained within the filter.

At step 522, the system may receive a SIP request (e.g., SIP communication). In some embodiments, the SIP request may be transmitted from a computing device, such as a user terminal (e.g., client), associated with a particular user agent or subscriber on the network. After receiving the SIP request, the method may move to step 523 where the system may retrieve a first filter template (e.g., filter template). In some embodiments, the system may retrieve from memory a filter template identified during step 521. In other embodiments, the system may retrieve a filter template from one or more suitable computing devices operatively coupled to the network.

At step 524, the system may determine whether the SIP request received during step 522 matches the filter template retrieved during step 503. In some embodiments, the system may compare one or more data fields (e.g., parameters) of the received SIP request with information elements in the filter template to determine if the SIP request contains information that should be tracked.

If the system determines that the SIP request does not match the retrieved filter template, the method may proceed to step 533. For example, if the filter template retrieved at step 503 requires a calling party identifier, a called party identifier and a time of call, and the SIP request retrieved at step 522 does not contain each of those parameters, the system may determine that the SIP request does not match the filter template. At step 533, the system may determine whether any additional filter templates should be analyzed. If the system determines that additional filter templates should be analyzed, the method may proceed to step 535, where the system may retrieve the next filter template. After retrieving the next filter template, the method may proceed back to step 524, where the system may determine whether the SIP request received during step 522 matches the next filter template (e.g., the filter template retrieved at step 535).

Referring back to step 524, if the system determines that the SIP request received during step 522 matches a retrieved filter template, (e.g., the SIP communication contain information identified in a filter template, retrieved during either one of steps 523 or 535, that needs to be tracked), the method may proceed to step 525, where the system may determine if a filter corresponding to the retrieved filter template and incoming SIP request has already been created. In some embodiments, the system may transmit a request to one or more computing devices for information identifying filters corresponding to the retrieved filter template and incoming SIP request. In other embodiments, the system may query a database of filters based on information contained within the SIP request (e.g., calling/called party identifiers) to identify one or more corresponding filters. In such embodiments, the system may be configured to query the database in accordance with the one or more information elements identified in the filter template. For example, if a filter template indicates that the calling party identifier of an incoming SIP communication needs to be tracked, the system may be configured to query the database using the calling party identifier of the SIP request to determine if a corresponding (e.g., matching) filter exists.

If the system determines that a corresponding (e.g., matching) filter does not exist, the method may proceed to step 526, where the system may generate a new filter in accordance with the SIP request received at step 522. In some embodiments, the system may retrieve from a database information identifying the timer and/or record counter limit values for the new filter. In other embodiments, the system may request from one or more computing devices information identifying the timer and/or record counter limit values for the filter. In another embodiment, the system may request from one or more computing devices information identifying whether the new filter is static or dynamic. During step 526, the system may be configured to flag the filter with an identifier indicating whether the filter is static or dynamic. In other embodiments, the system may associate, in a database, information identifying the generated filter with information identifying the filter template analyzed at step 525.

Referring back to step 525, if the system determines that a matching filter exists, the method may proceed to step 527, where the system may retrieve the filter matching the filter template and SIP request analyzed during step 505. As will be appreciated, there are a variety of ways in which the system may retrieve the matching filter. For example, in one embodiment, the system may retrieve the filter from memory. As another example, the system may query a database to determine the location of the corresponding (e.g., matching) filter.

At step 528, the system may determine whether the filter retrieved at step 527 has been flagged (e.g., identified) as "static." If the filter has been identified as static, additional data records cannot be added to the filter, and existing data records cannot be modified. Thus, the method may proceed to step 532, where the system may process the SIP request using a filtering policy associated with the filter template analyzed during step 525.

If the filter has not been identified as a "static" filter, the method may proceed to step 529, where the system may add a data record to the filter corresponding to the SIP request and filter template analyzed at step 524. The data record added to the filter may contain SIP request information that needs to be tracked as indicted by the filter template. For example, if the filter template indicates that a calling party identifier, a called party identifier, and a time of call needs to be tracked, a data record may be added to the filter containing information identifying at least the calling party, the called party, and the time of call for the SIP request received at step 522. In some embodiments, each data record added to the filter will contain identical information elements and corresponding data therein. After the data record has been added to (e.g. stored in) the filter, the system may increase (e.g., increment) by 1 the record counter of the filter (e.g., one of either the filter generated at step 526 or the filter retrieved at step 527). For example, referring to FIG. 4C, the system may increment record counter 423 for each data record (e.g., data records 424-426) added to filter 420.

After adding the data record to the filter, the method may proceed to step 530, where the system may remove any expired data records from the filter. There are various ways in which the system may determine if a data record has expired. For example, the system may compare information within a data record, such as the time of call, with the current time. If the difference between the current time and a data record's time of call exceeds the time window identified in the timer, then the data record has expired. In some embodiments, the system may be configured to delete from a filter any data records that have expired. After a data record has been deleted, the system may decrease (e.g., decrement) by 1 the record counter of the filter.

At step 531, the system may determine whether the record counter exceeds the counter limit (e.g., a threshold number of data records) for the filter (e.g., one of either the filter generated at step 526 or the filter retrieved at step 527). For example, referring to FIG. 4C, the system may determine whether the record counter meets and/or exceeds the counter limit of filter 420 by comparing information relating to the current number of data records within filter 420 (e.g., data stored in record counter 423) with information relating to the threshold number of data records associated with filter 420 (e.g., data stored in counter limit 422).

If the record counter does not exceed the counter limit, the method may proceed to step 533, where the system may determine whether any additional filter templates should be analyzed. If the record counter exceeds the counter limit, the method may proceed to step 532. At step 532, the system may process the SIP request using a filtering policy associated with the filter template analyzed during step 525. As will be appreciated, the one or more filtering policies associated with a particular filter template may govern how the system processes a SIP request.

After processing the SIP request, the method may proceed to step 533, where the system may determine whether any additional filter templates should be analyzed for the SIP request received during step 522. If the system determines that no additional filter templates should be processed, the method may proceed to step 534, and the system may exit the method. In some embodiments, if the system determines that no additional filter templates should be processed, the method may proceed from step 533 to step 522, where the system may receive another SIP request.

Figure 6A:
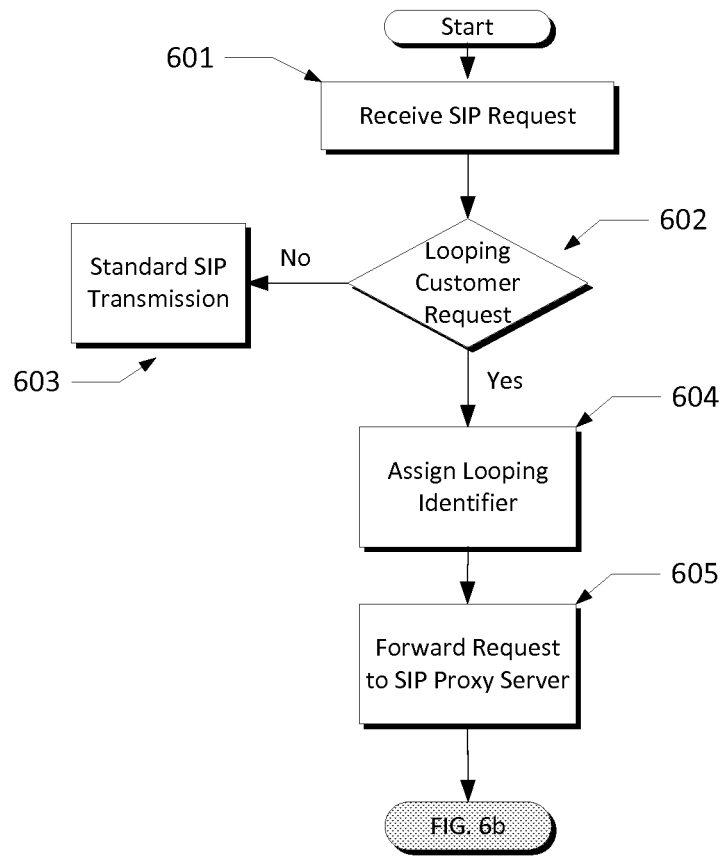
FIG. 6A illustrates an exemplary flowchart of a method in accordance with one or more aspects of the present disclosure.
Figure 6B:
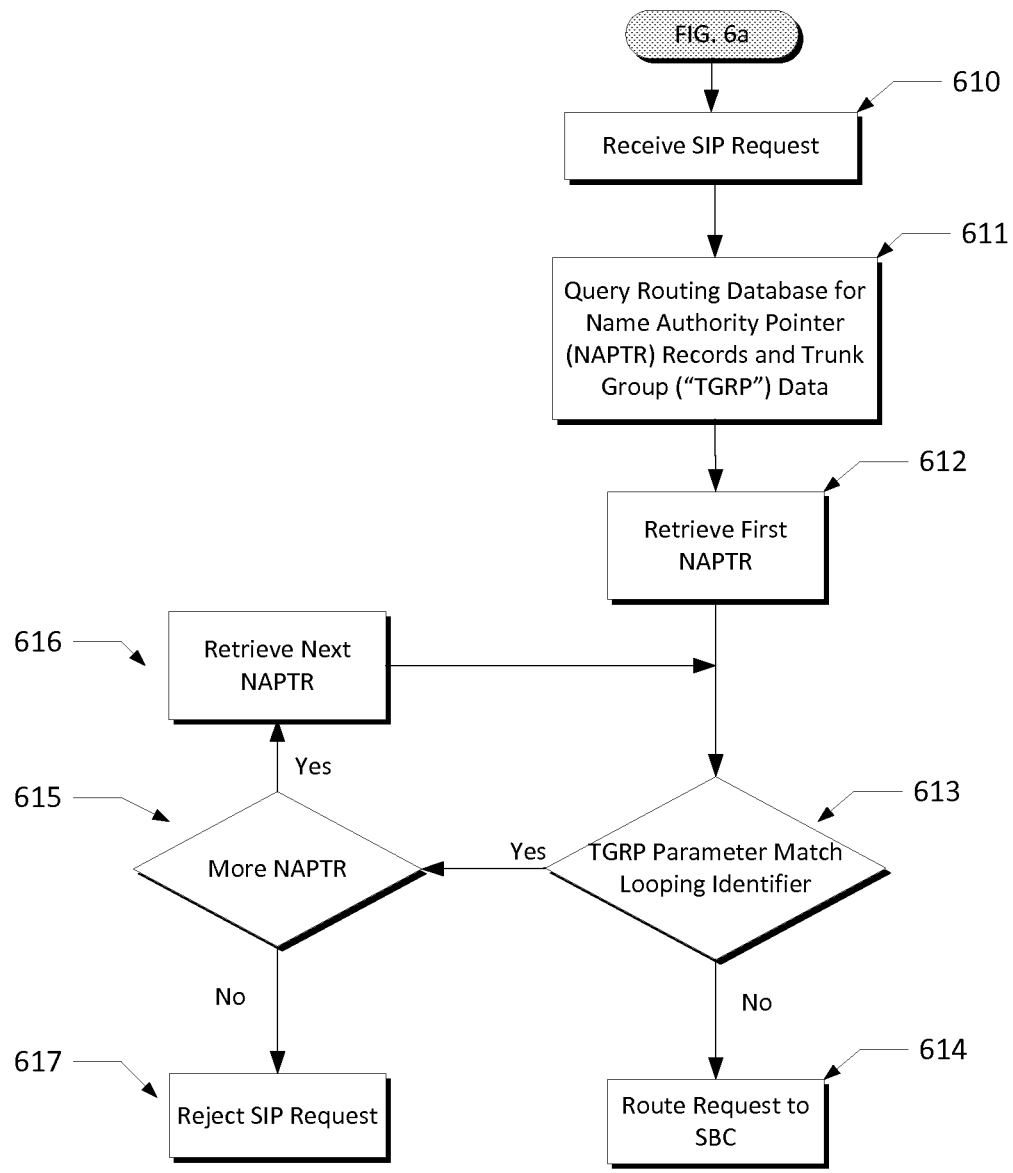
FIG. 6B illustrates an exemplary flowchart of a method in accordance with one or more aspects of the present disclosure.
Figure 7:
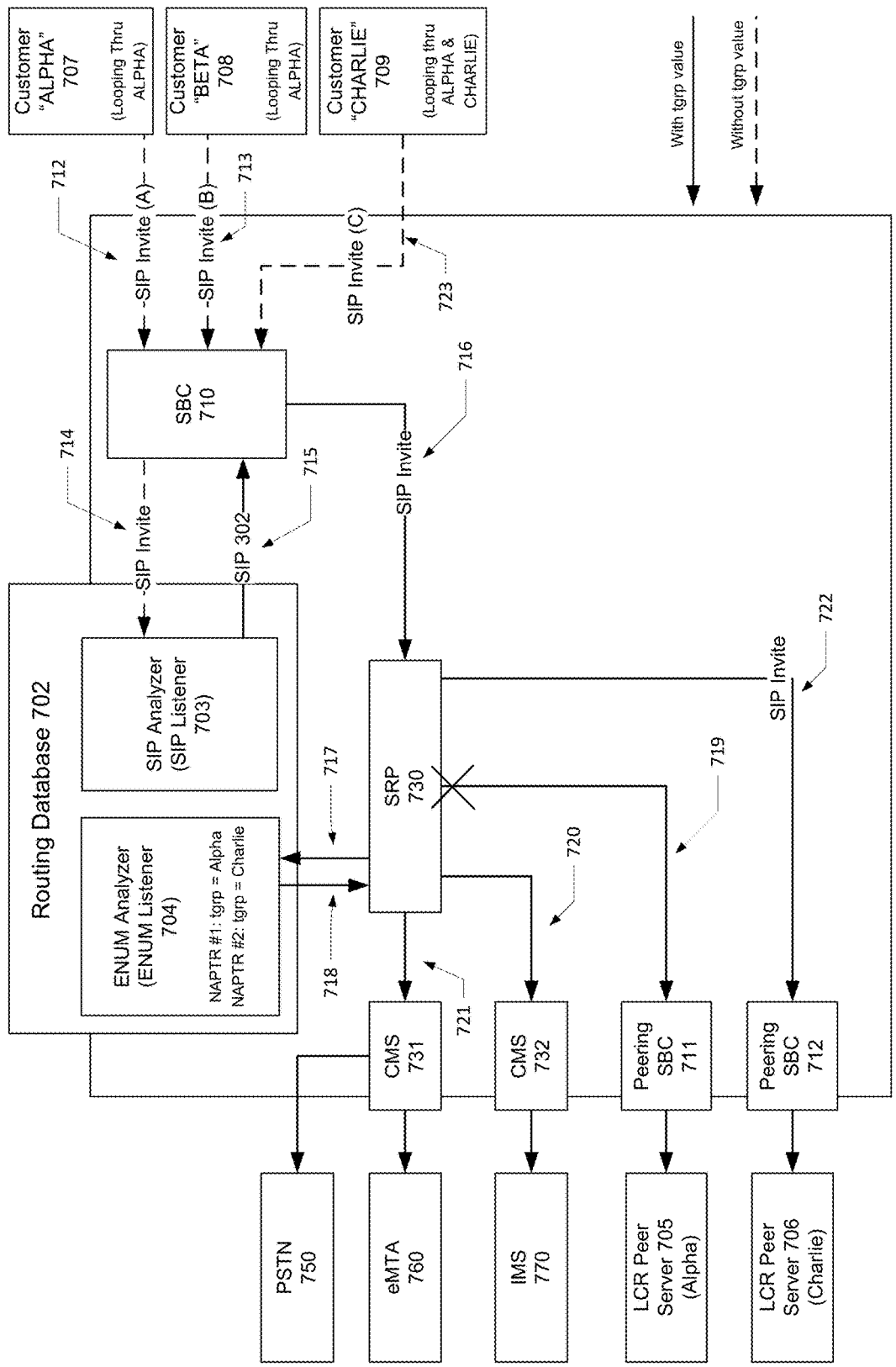
FIG. 7 illustrates architectures suitable for demonstrating one or more aspects of the exemplary methods depicted in FIGS. 6A and 6B.

FIGS. 6A and 6B illustrate an example method of loop suppression within an SIP environment according to one embodiment of the disclosure that may be performed by one or more computing devices, such as server 107 or any other suitable computing device. Additionally, FIG. 7 illustrates the details of the various components and computing devices associated with the suppression of a loop condition within a SIP environment according to one embodiment of the disclosure. Referring now to FIG. 6A, the process for manipulating an inbound SIP communication so as to suppress the occurrence of a loop condition or other undesirable call will now be described. As will be appreciated, the process of manipulating inbound SIP communications, depicted in FIG. 6A, also may be implemented by a suitable software program residing in a session border controller, such as session border controller 710 illustrated in FIG. 7.

At step 601, a session border controller, such as session border controller 710, may receive a SIP request (e.g., SIP communication). In some embodiments, session border controller may receive a SIP request, such as a SIP invite, from one or more computing devices, such as a client terminal, associated with a particular customer or subscriber on the network. In one of these embodiments, the session border controller may simultaneously receive multiple SIP requests from one or more subscribers. In other embodiments, the session border controller may receive a SIP request from a proxy server or other suitable computing device configured to transmit SIP requests.

At step 602, the session border controller may determine whether the SIP request received at step 601 was transmitted from a computing device associated with a looping customer (e.g., a wholesale customer or subscriber having a high likelihood of initiating a loop condition or other undesirable call). In some embodiments, any wholesale customer on the network that also operates as a peering service provider may be identified as a looping customer. In other embodiments, the session border controller may analyze the SIP request to retrieve information identifying the originator of the SIP request. In one of these embodiments, the session border controller may query a database containing information identifying one or more looping customers to determine whether the originator of the SIP request is a looping customer. In another of these embodiments the session border controller may query a database containing information identifying one or more proxy servers associated with a looping customer to determine whether the SIP request was forwarded from said proxy server. In one embodiment, the session border controller may transmit a request to one or more computing devices for information identifying one or more looping customers.

If the session border controller determines that the SIP request was not transmitted by a looping customer, the method may proceed to step 603, where the session border controller may transmit the SIP request under standard protocols (e.g., transmit the SIP request to its intended destination). For example, the session border controller may forward the SIP request to another computing device based on a destination address or other URI information identified in the SIP request.

If the session border controller determines that the SIP request was transmitted by a looping customer, the method may proceed to step 604, where the session border controller may assign a unique looping identifier (e.g., looping ID) to the SIP request. The looping identifier may impact one or more routing choices for the SIP request based on known looping conditions or calling patterns that have been identified by the system. As will be appreciated, there are a variety of ways in which the session border controller may assign a looping ID to the SIP request. For example, the session border controller may add an organization header field to the header of the SIP request received at step 601. The session border controller may also populate the organization header field with data, as further discussed below. The organization header field refers to a named attribute within the SIP header that provides additional information about the SIP request. In some embodiments, the organization header field assigned by the session border controller to the SIP request may store data identifying the looping customer that is providing peering services for the transmitted SIP request. In other embodiments, the organization header field may store information relating to a naming convention resolving to the routing peer corresponding to the looping customer. In another embodiment, the session border controller may assign the SIP request an alphanumeric symbol corresponding to a name and/or other identifier resolving to the routing peer server associated with the looping customer.

As described in RFC 4904 produced by the Network Working Group in June 2007, trunking data identifies specific circuits in a network, such as the PSTN, that represent a communications path connecting two switching systems that are used to establish an end to end connection. Trunking data may include trunk group parameters, such as a trunk group identifier ("TGRP ID") and trunk-context information. Trunking data may be included within a SIP request while the request is routed from a client (e.g., computing device associated with a service or network subscriber) to a final destination. In one of these embodiments, the session border controller may analyze data (e.g., URI data) associated with the SIP request received at step 601 to identify the TGRP ID and trunk-context information associated with the SIP request. In some embodiments, the session border controller may transmit a query to a database to retrieve trunking data associated with the SIP request. For example, a session border controller may transmit a query to a routing database to determine the TGRP ID and trunk-context information for the SIP request received at step 601.

After the looping ID is assigned to the SIP request, the method may proceed to step 605, where the session border controller may forward (e.g., transmit) the SIP request to a SIP proxy server. In some embodiments, the session border controller may analyze one or more data fields in the SIP request to determine a destination address for the SIP proxy server. In other embodiments, the session border controller may transmit the SIP request to a routing proxy server, such as routing proxy server 730 illustrated in FIG. 7. In one of these embodiments, the session border controller may query a routing database, such as routing database 702 illustrated in FIG. 7, to retrieve routing information for forwarding the SIP request. In another of these embodiments, the session border controller may receive from a computing device or suitable application program therein, such as SIP Listener 703 illustrated in FIG. 7, a SIP redirect code instructing the session border controller to transmit the SIP request to a particular computing device (e.g., routing proxy server). As will be appreciated, the SIP Listener may be a JAVA servlet application or other suitable programming application and/or interface that may listen for SIP-specific events during a SIP session.

Referring now to FIG. 6B, the process for manipulating an outbound SIP communication so as to suppress the occurrence of a loop condition will now be described. As will be appreciated, the process of manipulating SIP communications, as illustrated in FIG. 6B, may be implemented by a SIP routing proxy server ("SRP"), such as SRP 730 illustrated in FIG. 7, or suitable software program residing therein.

At step 610, the SIP routing proxy server may receive a SIP request (e.g., SIP communication). In some embodiments, the SIP routing proxy server may receive the SIP request from a session boarder controller, such as SBC 710 illustrated in FIG. 7. As will be appreciated, the SIP routing proxy server may receive a SIP request forwarded by a session border controller performing one or more of the steps of the process embodied in FIG. 6A. In other embodiments, the SIP routing proxy server may receive the SIP request from an intermediary proxy server within a network.

At step 611, the SIP routing proxy server may query a routing database for one or more Name Authority Pointer ("NAPTR") records and trunking data associated with the SIP request received at step 610. The routing database, such as routing database 702 illustrated in FIG. 7, may include an ENUM listener and a SIP listener. The ENUM listener, such as ENUM listener 704, may listen for routing requests transmitted by one or more computing devices on the network. As described in RFC 3403 produced by the Network Working Group in October 2002, a NAPTR is a type of Domain Name System ("DNS") resource record which provides translation of a string (e.g., telephone number information) into a destination URI. A NAPTR record can be used to lookup a destination number, and resolve the number to a destination, such as a SIP server or other URI-formatted destination. The NAPTR record may include trunk group ("TGRP") parameters identifying various trunking data.

In some embodiments, the SIP routing proxy server may utilize information associated with one or more data fields of the SIP request to transmit a query to the routing database. In one of these embodiments, the routing database may identify one or more NAPTR records responsive to a routing database query transmitted by the SIP routing proxy server. In another embodiment, the SIP routing proxy server may utilize the looping ID assigned to the SIP request to transmit a query to the routing database. In other embodiments, the SIP routing proxy server may utilize trunking data associated with the SIP request to transmit a query to the routing database.

At step 612, the SIP routing proxy server may retrieve a first NAPTR record identified by the routing database during step 611. In some embodiments, the SIP routing proxy server may transmit a request for a first NAPTR record responsive to transmitting the routing database query. In other embodiments, the SIP routing proxy may store in memory the first retrieved NAPTR record responsive to transmitting the routing database query. In one embodiment, the SIP routing proxy server may transmit a request for information relating to one or more trunk group parameters associated with the retrieved NAPTR record responsive to transmitting the routing database query.

At step 613 the SIP routing proxy server may determine whether a trunk group parameter (e.g., TGRP ID or trunk-context information) associated with a retrieved NAPTR record corresponds to the unique looping ID assigned to the SIP request received at step 610. In some embodiments, the SIP routing proxy server may compare the TGRP ID associated with the retrieved NAPTR record to data within the organization header field of the SIP request to determine a match. In one of these embodiments, the SIP routing proxy server may determine a match exists if the TGRP ID associated with the retrieved NAPTR record is identical to the data within the organization header field of the SIP request. In another of these embodiments, the SIP routing proxy server may determine a match exists if a first portion of the TGRP ID associated with the retrieved NAPTR record corresponds to a first portion of the data within the organization header field of the SIP request. For example, the SIP routing proxy server may determine whether a match exists by comparing a first portion of the TGRP ID to a first portion of the alphanumeric symbol corresponding to the name and/or other identifier resolving to the routing peer associated with the looping customer. As another example, the SIP routing proxy server may determine whether a match exists by comparing a first portion of the TGRP ID to a first portion of the naming convention resolving to the routing peer associated with the looping customer.

If the SIP routing proxy server determines that the trunk group parameter analyzed during step 613 does not corresponds to the unique looping ID assigned to the SIP request, the method may proceed to step 614. For example, if the trunk group parameter does not match the data stored in the organization header of the SIP request, the method may proceed to step 614. In this example, because the trunk group parameter does not match the data stored in the organization header (which may identify the looping customer associated with the SIP request), routing the SIP request to a destination address that is not associated with the looping customer may suppress the incidence of a looping condition or similar messaging error.

At step 614, the SIP routing proxy server may transmit the SIP request to a computing device, such as a session border controller, for egress to a peer or proxy server in accordance with the NAPTR record, analyzed during step 613, having a trunk group parameter that did not correspond to the unique looping ID assigned to the SIP request. In some embodiments, the SIP routing proxy server may forward the SIP request based on the destination address (e.g., URI data) associated with the trunk group parameter (e.g., TGRP ID) that did not correspond to the unique looping ID assigned to the SIP request. In another embodiment, during step 614, the SIP routing proxy server may remove data residing in the organization header field of the SIP request before transmitting the SIP request.

If the SIP routing proxy server determines that the trunk group parameter analyzed during step 613 corresponds to the unique looping ID assigned to the SIP request, the method may proceed to step 615. For example, if the trunk group parameter matches the data stored in the organization header of the SIP request, the method may proceed to step 615. At step 615, the SIP routing proxy server may determine whether any additional NAPTR records identified during step 611 should be analyzed. If the system determines that additional NAPTR records should be analyzed, the method may proceed to step 513, If the SIP routing proxy server determines that additional NAPTR records identified during step 611 have yet to be analyzed, the method may proceed to step 616, where the SIP routing proxy server will retrieve a next NAPTR record. After receiving the next NAPTR record, the method may proceed back to step 613. The system may continue to analyze each NAPTR record identified during step 611 to determine whether any NAPTR records include a trunk group parameter that does not correspond to the unique looping ID assigned to the SIP request. Thus, the SIP routing proxy server will continue to analyze NAPTR records to determine a destination address of a peer or proxy server that will not result in the occurrence of a condition.

By contrast, if the SIP proxy server determines that no additional NAPTR records should be analyzed (e.g., all of the NAPTR records identified during identified during step 611 have been analyzed), the method may proceed to step 617. As it will be appreciated, the method may proceed to step 617 in the instance where each of the NAPTR records retrieved from the routing database include a trunk group parameter that corresponds to the unique ID assigned to the SIP request. Thus, if every possible destination to route the SIP request will result in the occurrence of a looped SIP request, the method may proceed to step 617. For example, in some embodiments, the method may proceed to step 617 in the instance where each of the NAPTR records retrieved from the routing database include a TGRP ID that corresponds to (e.g., matches) the data stored in the organization header field of the SIP request (e.g., data resolving to the routing peer associated with the looping customer).

At step 617, the SIP routing proxy server may reject the SIP request. In some embodiments, SIP routing proxy server may transmit one or more response codes to a computing device associated with the originator of the SIP request. As will be appreciated, a variety of response codes may be transmitted to the originator of the SIP request. For example, the system may send a SIP 482 response code indicating that the system has detected a loop. As another example, the system may send a SIP 487 response code indicating that the SIP request has terminated. As yet another example, the system may send a SIP 503 response code indicating that the proxy server is temporarily overloaded and cannot process the SIP request.

Referring now to FIG. 7, the various components and computing devices involved in the process of suppressing a detected loop according to one or more embodiments of the disclosure illustrated in FIGS. 6A and 6B will now be described. In this example, three separate wholesale customers, (i.e., customers 707-709), are each attempting to forward a SIP invite across the network. In this example, "ALPHA" is a naming convention used to represent/identify customer 707; "BETA" is a naming convention used to represent/identify customer 708; and "CHARLIE" is a naming convention used to represent/identify customer 709. As discussed above, a session border controller, such as SBC 710, may receive one or more SIP requests from various customers during a SIP session. In this example, SBC 710 receives SIP Invite A from customer 707, SIP Invite B from customer 708, and SIP Invite C from customer 709, as illustrated in FIG. 7 by elements 712, 713, and 723, respectively. As indicated at step 602 of FIG. 6A, SBC 710 may then determine whether SIP Invites A-C were transmitted by looping customers.

In this example, as illustrated by LCR peer servers 705 and 706 in FIG. 7, customer 707 and customer 709 operate as both wholesale customers on the network and as LCR peering service providers, and as such, customer 707 and customer 709 may be identified by the system as looping customers. Furthermore, as illustrated in FIG. 7, customer 708 utilizes customer 707 (i.e., ALPHA) as a peering service provider, and as such, SIP requests transmitted by customer 708 may be routed through peer server 705. Thus, in this example, a SIP Invite (or other SIP request) transmitted by customer 707 to peer server 705 (e.g., the peer server corresponding to ALPHA) may likely result in a loop condition. Similarly, a SIP Invite (or other SIP request) transmitted by customer 708 to peer server 705 may likely result in the occurrence of a loop.

As indicated at step 604 of FIG. 6A, SBC 710 may assign a unique looping ID to SIP Invites A and B. In this example, SBC 710 assigns the unique looping IDs by modifying SIP Invites A and B to include an organization header field storing the naming convention associated with peer server 705, i.e., "ALPHA." With respect to customer 709, a SIP Invite (or other SIP request) transmitted by customer 709 to peer server 706 may likely result in a loop condition. Accordingly, SBC 710 assigns a unique looping ID by modifying SIP Invite C to include one or more organization header fields storing the naming convention associated with peer server 705, i.e., "ALPHA" and peer server 706, i.e., "CHARLIE."

Next, as depicted by element 714 in FIG. 7, SBC 710 may query routing database 702 to determine where to route SIP Invites A-C. In this example, SIP Listener 703 transmits a SIP response code (i.e., SIP 302) instructing SBC 710 to redirect SIP Invites A-C to SIP routing proxy 730, as depicted by element 715 in FIG. 7. SBC 710 may modify the contact header fields for SIP Invites A-C to identify the destination address, or other URI information, for SIP routing proxy server 730. SBC 710 subsequently transmits SIP Invites A-C to SIP routing proxy server 730, as depicted by element 716.

For each SIP Invite received, SIP routing proxy server 730 may query routing database 702 to identify the NAPTR record(s) and trunking data (e.g., TGRP IDs and/or trunk-context information) for routing the SIP invite, as illustrated by element 717 in FIG. 7. In this example, ENUM Listener 704 identifies two NAPTR records for forwarding each of SIP Invites A-C. The first NAPTR record identified by ENUM Listener 704 includes a TGRP ID identifying peer server 705 (i.e., ALPHA). The second NAPTR record identified by ENUM Listener 704 includes a TGRP ID identifying peer server 706 (i.e., CHARLIE).

As depicted by element 718 in FIG. 7, SRP 730 may retrieve the first NAPTR record identified in connection with SIP Invite A, and subsequently determine whether the TGRP ID associated with the first NAPTR record corresponds to the unique looping ID stored in the organization header field of SIP Invite A. In this example, the TGRP ID associated with the first NAPTR record and the organization header field of SIP Invite A match, as they both contain the term "ALPHA." As such, SRP 730 will not route SIP Invite A to peer server 705, as depicted by element 719 being crossed-out in FIG. 7.

Instead, SRP 730 then determines whether additional NAPTR records identified by the routing database should be analyzed. Since the second NAPTR record has not been analyzed, SRP 730 retrieves the second NAPTR record and determines whether the TGRP ID associated with the second NAPTR record corresponds to the unique looping ID stored in the organization header field of SIP Invite A. In this example, the TGRP ID for the second NAPTR record corresponds to CHARLIE, while the looping ID stored in the organization header field of SIP Invite A corresponds to ALPHA. Because the TGRP ID associated with the second NAPTR record does not correspond to the unique looping ID stored in the organization header field of SIP Invite A, SRP 730 routes Invite A to peering SBC 712 for egress to the peer server indicated in the TGRP ID associated with the second NAPTR record (i.e., peer server 706), as depicted by element 722. Alternatively, SRP 730 may route SIP Invite A to various other destination endpoints such as call management servers 731 or 732, which may subsequently forward the invite to embedded multi-media terminal 760 or IP multi-media sub-system network 770, respectively.

With respect to SIP Invite B, and similar to the process for analyzing and routing SIP Invite A, SIP routing proxy server 730 may compare the looping ID stored in the organization header field of SIP Invite B to the TGRP ID associated with the first and second NAPTR records retrieved from the routing database. Because the TGRP ID of the second NAPTR record does not correspond to the looping ID stored in the organization header field of SIP Invite B, SRP 730 routes Invite B to peering SBC 712 for egress to the peer server indicated in the TGRP ID associated with the second NAPTR record (i.e., peer server 706), as depicted by element 722.

Referring now to element 718 in FIG. 7, with respect to SIP Invite C, SRP 730 may retrieve the first NAPTR record for SIP Invite C and determine whether the TGRP ID associated with the first NAPTR record corresponds to (e.g., matches) the looping ID stored in the organization header field of SIP Invite C. In this example, the TGRP ID associated with the first NAPTR record corresponds to "ALPHA," while a looping ID stored in one of the organization header fields of SIP Invite C also corresponds to "ALPHA." As such, SRP 730 will not route SIP Invite C to peer server 705, as illustrated by element 719 being crossed-out in FIG. 7. Rather, SRP 730 subsequently determines whether any additional NAPTR records should be analyzed. Since the second NAPTR record has not been analyzed, SRP 730 retrieves the second NAPTR record and determines whether the TGRP ID associated with the second NAPTR record corresponds to the looping ID stored in the organization header field of SIP Invite C.

In this example, the TGRP ID associated with the second NAPTR record and the unique looping ID stored in the organization header field of SIP Invite C both correspond to "CHARLIE." Because the TGRP ID of the second NAPTR record matches the unique looping ID stored in the organization header field of SIP Invite C, SRP 730 checks to see whether any additional NAPTR records should be analyzed. Since all of the NAPTR records identified by routing database 702 have been analyzed and determined to include TGRP IDs that corresponds to unique looping IDs stored in the organization header fields of SIP Invite C, the SIP routing proxy server rejects SIP Invite C.

In the example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
   receiving, from a first computing device and via a network, a communication addressed to a first destination;
   determining, by a second computing device, that a number of instances the communication was routed through a node on the network satisfies a threshold; and
   after the determining that the number of instances satisfies the threshold:
      modifying, by the second computing device, a header of the communication to include a data field comprising a looping identifier indicating that the communication was sent by a looping customer; and
      routing, to the first destination and based on the looping identifier, the communication to suppress an occurrence of a loop condition.

2. The method of claim 1, wherein the data field comprises an organization header field.

3. The method of claim 2, wherein the organization header field further comprises data indicating that the looping customer is providing peering services for the communication.

4. The method of claim 1, further comprising:
   retrieving data indicating an originator of the communication; and
   querying, based on the data indicating the originator of the communication, a database identifying computing devices associated with one or more looping customers.

5. The method of claim 1, further comprising:
   retrieving data indicating an originator of the communication; and
   querying, based on the data indicating the originator of the communication, a database identifying a plurality of looping customers.

6. The method of claim 1, wherein modifying the header of the communication to include the data field further comprises:
   adding an organization header field that identifies a routing device associated with the loop condition.

7. The method of claim 6, wherein a source of the loop condition is different from an originator of the communication.

8. An apparatus comprising:
   one or more processors; and
   memory storing computer executable instructions that, when executed by the one or more processors, cause the apparatus to:
      receive, from a first computing device and via a network, a communication addressed to a first destination;
      determine that a number of instances the communication was routed through a node on the network satisfies a threshold; and
      after determining that the number of instances satisfies the threshold:
         modify a header of the communication to include a data field comprising a looping identifier indicating that the communication was sent by a looping customer; and
         route, to the first destination and based on the looping identifier, the communication to suppress an occurrence of a loop condition.

9. The apparatus of claim 8, wherein the computer executable instructions, when executed by the one or more processors, further cause the apparatus to:
   determine that the first computing device is associated with the looping customer.

10. The apparatus of claim 9, wherein the computer executable instructions, when executed by the one or more processors, further cause the apparatus to determine that the first computing device is associated with the looping customer by:
  retrieving data indicating an originator of the communication; and
  querying, based on the data indicating the originator of the communication, a database to determine computing devices associated with one or more looping customers.

11. The apparatus of claim 9, wherein the computer executable instructions, when executed by the one or more processors, further cause the apparatus to determine that the first computing device is associated with the looping customer by:
  retrieving data indicating an originator of the communication; and
  querying, based on the data indicating the originator of the communication, a database to determine a plurality of looping customers.

12. The apparatus of claim 8, wherein the computer executable instructions, when executed by the one or more processors, further cause the apparatus to:
  query a database to determine one or more proxy servers that have sent the communication.

13. The apparatus of claim 8, wherein the computer executable instructions, when executed by the one or more processors, further cause the apparatus to:
  send, based at least in part on the looping identifier, a database query to obtain data indicating one or more looping customers.

14. The apparatus of claim 8, wherein the computer executable instructions, when executed by the one or more processors, further cause the apparatus to:
  query a database to receive trunking data associated with the communication.

15. One or more non-transitory computer readable storage media storing computer executable instructions that, when executed by an apparatus, cause the apparatus to:
  receive, from a first computing device and via a network, a communication addressed to a first destination;
  determine that a number of instances the communication was routed through a node on the network satisfies a threshold; and
  after determining that the number of instances satisfies the threshold:
    modify a header of the communication to include a data field comprising a looping identifier indicating that the communication was sent by a looping customer; and
    route, to the first destination and based on the looping identifier, the communication to suppress an occurrence of a loop condition.

16. The one or more non-transitory computer readable storage media of claim 15, wherein the computer executable instructions, when executed, further cause the apparatus to:
  determine that the first computing device is associated with the looping customer.

17. The one or more non-transitory computer readable storage media of claim 16, wherein the computer executable instructions, when executed, further cause the apparatus to determine that the first computing device is associated with the looping customer by:
  retrieving data indicating an originator of the communication; and
  querying, based on the data indicating the originator of the communication, a database to determine whether the communication was sent by one or more looping customers.

18. The one or more non-transitory computer readable storage media of claim 15, wherein the computer executable instructions, when executed, further cause the apparatus to:
  query a database to retrieve routing information for the first computing device.

19. The one or more non-transitory computer readable storage media of claim 15, wherein the computer executable instructions, when executed, further cause the apparatus to modify the header of the communication to include the data field by:
  adding an organization header field that identifies a routing device associated with the loop condition.

20. The one or more non-transitory computer readable storage media of claim 15, wherein the data field further comprises data indicating the loop customer that is providing peering services for the communication.

* * * * *